(12) United States Patent
Bebon et al.

(10) Patent No.: US 12,252,085 B2
(45) Date of Patent: Mar. 18, 2025

(54) VEHICLE AIR MANAGEMENT SYSTEM

(71) Applicant: VOLVO TRUCK CORPORATION, Gothenburg (SE)

(72) Inventors: Hugo Bebon, Saint-Priest (FR); Jean-Sebastien Carle, Lyons (FR)

(73) Assignee: Volvo Truck Corporation, Gothenburg (SE)

( * ) Notice: Subject to any disclaimer, the term of this patent is extended or adjusted under 35 U.S.C. 154(b) by 292 days.

(21) Appl. No.: 18/064,049

(22) Filed: Dec. 9, 2022

(65) Prior Publication Data
US 2023/0182664 A1 Jun. 15, 2023

(30) Foreign Application Priority Data
Dec. 15, 2021 (EP) .................................... 21214836

(51) Int. Cl.
*B60R 16/08* (2006.01)
*F17C 6/00* (2006.01)
*G05D 16/20* (2006.01)

(52) U.S. Cl.
CPC ............... *B60R 16/08* (2013.01); *F17C 6/00* (2013.01); *G05D 16/2013* (2013.01); *F17C 2205/0326* (2013.01); *F17C 2205/0338* (2013.01); *F17C 2221/031* (2013.01); *F17C 2227/0157* (2013.01); *F17C 2250/03* (2013.01); *F17C 2250/0417* (2013.01); *F17C 2250/043* (2013.01); *F17C 2270/0168* (2013.01)

(58) Field of Classification Search
CPC .... B60R 16/08; F17C 6/00; F17C 2205/0326; F17C 2205/0338; F17C 2221/031; F17C 2227/0157; F17C 2250/03; F17C 2250/0417; F17C 2250/043; F17C 2270/0168; G05D 16/2013
See application file for complete search history.

(56) References Cited

U.S. PATENT DOCUMENTS

| 6,089,831 A * | 7/2000 | Bruehmann ....... B60G 17/0526 |
| | | 417/302 |
| 6,149,246 A * | 11/2000 | Terborn ................. B60T 17/06 |
| | | 280/124.16 |
| 6,318,813 B1 * | 11/2001 | Goodell ................. B60T 17/18 |
| | | 280/124.16 |

(Continued)

FOREIGN PATENT DOCUMENTS

| CN | 111002962 A | 4/2020 |
| DE | 102018217975 A1 | 4/2020 |

(Continued)

OTHER PUBLICATIONS

Extended European Search Report in corresponding European Application No. 21214836.5 dated May 25, 2022 (7 pages).

*Primary Examiner* — Luis A Martinez Borrero
(74) *Attorney, Agent, or Firm* — Venable LLP; Jeffri A. Kaminski

(57) ABSTRACT

A vehicle air management system is provided. The vehicle air management system comprises an air tank and a boost air tank. Based on a signal indicative of an air consumption level of at least one air consumer, a control unit is configured to control the vehicle air management system to deliver pressurized air from the boost air tank to be supplied to an air compressor.

15 Claims, 4 Drawing Sheets

(56) References Cited

U.S. PATENT DOCUMENTS

| | | | | |
|---|---|---|---|---|
| 8,220,876 B2* | 7/2012 | Detlefs | .................. | B60T 17/02 |
| | | | | 303/3 |
| 8,382,448 B2* | 2/2013 | Fries | ...................... | B60T 17/02 |
| | | | | 251/129.05 |
| 9,650,029 B2* | 5/2017 | Hilberer | ............... | B60T 17/004 |
| 9,802,593 B2* | 10/2017 | Frashure | .............. | B60T 13/683 |
| 10,221,998 B2* | 3/2019 | Masuda | ................ | F17C 13/084 |
| 10,596,873 B2* | 3/2020 | Reuter | ................ | B60G 17/019 |
| 11,440,520 B2* | 9/2022 | Heer | ................. | B60T 13/268 |
| 11,465,462 B2* | 10/2022 | Vaughan | ............... | B60G 21/026 |
| 11,542,966 B2* | 1/2023 | Meier | ............... | B60G 17/0523 |
| 11,787,378 B2* | 10/2023 | Hecker | ................ | B60T 15/025 |
| | | | | 303/119.2 |
| 2002/0059972 A1* | 5/2002 | Rheinhardt | .......... | B60C 23/004 |
| | | | | 152/418 |
| 2007/0096554 A1* | 5/2007 | Detlefs | .................. | B60T 17/02 |
| | | | | 303/127 |
| 2008/0319687 A1* | 12/2008 | Kurosawa | ............ | F17C 13/025 |
| | | | | 702/50 |
| 2014/0091574 A1* | 4/2014 | Favy | ......................... | F02C 6/16 |
| | | | | 137/209 |
| 2014/0158095 A1* | 6/2014 | Pursifull | .......... | F02M 35/10163 |
| | | | | 123/559.1 |
| 2018/0100362 A1* | 4/2018 | Berlage | ..................... | E21B 7/02 |
| 2018/0156110 A1* | 6/2018 | Matsukuma | ............. | F02C 1/04 |
| 2018/0222275 A1* | 8/2018 | Reuter | ............... | B60G 17/0523 |
| 2019/0039431 A1* | 2/2019 | Vaughan | ............ | F15B 13/0406 |
| 2019/0346082 A1* | 11/2019 | Lewis | ...................... | B65G 5/00 |
| 2021/0039469 A1* | 2/2021 | Vaughan | ............ | B60G 17/0525 |
| 2021/0207586 A1* | 7/2021 | Lewis | ....................... | F03D 9/17 |
| 2021/0372322 A1* | 12/2021 | Alford | ..................... | F25J 1/0242 |
| 2022/0196341 A1* | 6/2022 | Young | ..................... | B65G 5/00 |
| 2022/0268208 A1* | 8/2022 | Martin | ..................... | F02C 6/12 |
| 2023/0216340 A1* | 7/2023 | Cohen | ..................... | F17C 1/007 |
| | | | | 60/327 |

FOREIGN PATENT DOCUMENTS

| | | | | |
|---|---|---|---|---|
| FR | 2921127 A1 | | 3/2009 | |
| JP | 1-218912 A | | 9/1989 | |
| JP | 2002138958 A | | 5/2002 | |
| WO | WO-2006004493 A1 * | | 1/2006 | ............. B60T 17/02 |

\* cited by examiner

VEHICLE AIR MANAGEMENT SYSTEM

TECHNICAL FIELD

The present invention relates to a vehicle air management system. The present invention also relates to a method of controlling such a vehicle air management system. Although the invention will mainly be directed to a vehicle in the form of a truck, the invention may also be applicable for other types of vehicles, such as e.g. an cars, buses, working machines, etc.

BACKGROUND

Vehicles conventionally comprises a plurality of pneumatically operated auxiliary devices. Such pneumatically operated auxiliary devices may e.g. be the wheel brakes, air suspension systems, pneumatic devices on a trailer, etc. The pneumatically operated auxiliary devices are, in particularly for hybrid vehicles and fully electrically propelled vehicles, receiving pressurized air from an electric air compressor.

In order to, for example, reduce cost as well as space and weight, one single air compressor is conventionally used for providing pressurized air to the various pneumatically operated auxiliary devices of the vehicle. The air compressor is thus designed to meet the different air pressure demands from these pneumatically operated auxiliary devices. More particularly, the single air compressor is often designed to deliver a given air flow. The given air flow particularly corresponds to an average air consumption for the pneumatically operated auxiliary devices during the operational lifetime of the vehicle.

However, a problem of designing the air compressor to meet an average air consumption is that the air compressor is unable to deliver a sufficient flow of pressurized air at different points in time when one of the pneumatically operated auxiliary devices so desires. Thus, there is a desire to further improve a vehicle air management system for being able to meet punctually higher pressurized air demands.

SUMMARY

It is thus an object of the present invention to at least partially overcome the above described deficiencies.

According to a first aspect, there is provided a vehicle air management system for a vehicle, the vehicle air management system comprising an air compressor configured to receive air from an air inlet via an air inlet conduit of the vehicle air management system, an air tank arranged in downstream fluid communication with the air compressor and configured to receive pressurized air from the air compressor, wherein the air tank comprises a first outlet connectable to at least one air consumer of the vehicle, a boost air tank configured to contain pressurized air, the boost air tank being arranged in downstream fluid communication with a second outlet of the air tank, wherein the boost air tank is arranged in upstream fluid communication with the air compressor, a first valve arranged in fluid communication between the air tank and the boost air tank, a second valve arranged in fluid communication between the boost air tank and the air compressor, and a control unit connected to the first and second valves, wherein the control unit comprises control circuitry configured to receive a signal indicative of an air consumption level of the at least one air consumer, compare the air consumption level with a predetermined threshold limit, and when the air consumption level is higher than the predetermined threshold limit: control the first valve to assume a closed position to prevent air from the air tank to reach the boost air tank, and control the second valve to assume an open position to allow pressurized air from the boost air tank to reach air compressor for increasing a production rate of the pressurized air delivered from the air compressor.

The wording "air consumer" should be construed as a pneumatically operated device of the vehicle, i.e. a device which is configured to operate by receiving pressurized air from the air tank. The at least one air consumer may, for example, be a wheel brake of the vehicle, a pneumatic cylinder, an air suspension system, pneumatically controlled devices on a trailer, etc.

Furthermore, the boost air tank should be construed as an additional air tank, different from the air tank configured to supply pressurized air to the at least one air consumer. The boost air tank is configured to contain pressurized air, where the pressure level of the pressurized air in the boost air tank is preferably equal to the pressure level of the pressurized air in the air tank, or higher. How to obtain a high pressure level in the boost air tank will be evident from the below description of the present invention.

Furthermore, as described above, the control circuit is configured to receive a signal indicative of an air consumption level. This should be construed in such a way that the control circuitry receives information of a requested air consumption level for the at least one air consumer. The signal may be received in the form of a reduction rate of the pressure level in the air tank. In such a case, the reduction rate is compared to a reduction rate threshold level limit. Hence, when the pressure level in the air tank reduces relatively quickly, this can be an indication of a high air consumption level of the at least one air consumer. Accordingly, and according to an example embodiment, the air consumption level may be based on a reduction rate of the air pressure in the air tank. The signal may also be received in the form of an air consumer usage of the at least one air consumer. In such a case, the control circuitry receives information that indicated the current usage, i.e. the level of air usage, by the at least one air consumer.

Still further, the increase of the production rate of the air compressor should be construed that the air compressor supplies an increased air pressure level as well as an increased air mass flow when receiving the pressurized air from the boost air tank.

The present invention is based on the insight that by providing a boost air tank in fluid communication with the air compressor, pressurized air can be controllably delivered to the air compressor when the air consumption level suddenly increases. Accordingly, an advantage of the present invention is that one single air compressor can be used, where the air compressor can be designed to meet an average air pressure and air consumption level demand from the air consumer, and where the air compressor is boosted at air pressure and air consumption demand peaks. Accordingly, the boost tank can be arranged for a dedicated supercharging of the air compressor for temporarily increasing the production rate of the air compressor. To put it differently, the air compressor can be designed as compact as possible with a low weight, while at the same time being able to punctually increase the production rate. The vehicle air management system can thus provide pressurized air for a wider variety of air pressure demand levels from the air consumer.

According to an example embodiment, the air tank may further comprise an air tank pressure sensor connected to the control unit, wherein the signal indicative of the air consumption level is configured to be received from the air tank pressure sensor. Hence, when the air tank pressure sensor senses a sudden decrease of pressure in the air tank, the air compressor can be boosted with pressurized air from the boost air tank.

According to an example embodiment, the predetermined threshold limit may be based on a production rate of pressurized air supplied from the air compressor to the air tank.

The production rate should be construed as the ability to deliver pressurized air to the air tank. Accordingly, a reduction rate of the air pressure level in the air tank is compared to the production rate of pressurized air supplied from the air compressor. Thus, if the air compressor is providing pressurized air to the air tank at a lower rate compared to the rate of pressurized air leaving the air tank, then the air consumption level can be determined to exceed the predetermined threshold limit. Thus, the predetermined threshold limit can be a threshold indicating the ability of the air compressor to increase the pressure level of air tank. Put it differently, if the air compressor is running at maximum capacity and the pressure level in the air tank continues to be reduced, the air consumption level is determined to be higher than the predetermined threshold limit and the first valve is closed and the second valve is opened to supercharge the air compressor.

According to an example embodiment, the vehicle air management system may further comprise a pressure regulator in fluid communication between the second valve and the air compressor. Hereby, the pressure level of pressurized air from the boost air tank can be controlled. Preferably and according to an example embodiment, the pressure regulator may be a variable pressure regulator.

According to an example embodiment, the first valve may be a normally open valve. A normally open valve should be construed such that the valve is kept in the open position until forced to be arranged in the closed position.

According to an example embodiment, the second valve may be a normally closed valve. A normally closed valve should be construed such that the valve is kept in the closed position until forced to be arranged in the open position.

Accordingly, and according to an example embodiment, the control circuitry may be configured to control the first valve to assume the open position and the second valve to assume the closed position by omitting from transmitting a control signal to the first and second valves, respectively.

According to an example embodiment, the control circuitry may be further configured to, when the air consumption level is lower than the predetermined threshold limit, control the first valve to assume an open position to allow air to be supplied from the air tank to the boost air tank, and control the second valve to assume a closed position to prevent pressurized air from the boost tank to reach the air compressor. Hereby, the pressure level in the boost air tank can be increased when there is no desire to supercharge the air compressor. The boost air tank will thus be pressurized with air and ready for the next time the air compressor is in need of supercharging.

According to an example embodiment, the boost air tank may comprise a boost air tank pressure sensor connected to the control unit, wherein the control circuitry is configured to control the first and second valves based on a signal received from the boost air tank pressure sensor, the signal being indicative of a pressure level of the air in the boost air tank. The boost air tank pressure sensor advantageously monitors the pressure level in the boost air tank. This is particularly advantageous in a case where the boost air tank runs out of pressurized and becomes "empty" when the second valve assumes the open position. Hereby, the control unit can control the first valve to assume the open position and the second valve to assume the closed position.

According to an example embodiment, the vehicle air management system may further comprise a first one-way valve in the air inlet conduit in fluid communication between the air inlet and the air compressor, preventing air to flow from the boost air tank to the air inlet. An advantage of the first one-way valve is that pressurized air from the boost air tank is prevented to leak to through the air inlet and into the ambient environment.

According to an example embodiment, the vehicle air management system may further comprise a second one-way valve in fluid communication between the first valve and the boost air tank preventing air from flowing from the boost air tank to the first valve. An advantage of the second one-way valve is thus that the pressurized air from the boost air tank is prevented to leak back into the air tank. The second one-way valve is particularly advantageous in combination with a first valve arranged as normally open valve According to an example embodiment, the vehicle air management system may further comprise an air dryer. The air dryer can hereby remove any liquid fluid, such as e.g. water, from the pressurized air before the pressurized air is delivered into the air tank.

According to a second aspect, there is provided a vehicle, comprising a vehicle air management system according to any one of the embodiments described above in relation to the first aspect, and an air consumer arranged in downstream fluid communication with the first outlet of the air tank.

Effects and features of the second aspect are largely analogous to those described above in relation to the first aspect.

According to a third aspect, there is provided a method of controlling a vehicle air management system, the air management system comprising an air compressor, an air tank arranged in downstream fluid communication with the air compressor and configured to receive pressurized air from the air compressor, wherein the air tank comprises a first outlet connected to an air consumer of the vehicle, a boost air tank configured to contain pressurized air, the boost air tank being arranged in downstream fluid communication with a second outlet of the air tank, wherein the boost air tank is arranged in upstream fluid communication with the air compressor, a first valve arranged in fluid communication between the air tank and the boost air tank, and a second valve arranged in fluid communication between the boost air tank and the air compressor, wherein the method comprises the steps of determining an air consumption level of the air consumer, comparing the air consumption level with a predetermined threshold limit, and when the air consumption level is higher than the predetermined threshold limit: controlling the first valve to assume a closed position to prevent air from the air tank to reach the boost air tank, and controlling the second valve to assume an open position to allow pressurized air from the boost air tank to reach air compressor.

Effects and features of the third aspect are largely analogous to those described above in relation to the first aspect.

According to a fourth aspect, there is provided a computer program comprising program code means for performing the steps of the above described third aspect when the program code means is run on a computer.

According to a fifth aspect, there is provided a computer readable medium carrying a computer program means for performing the steps of the above described third aspect when the program means is run on a computer.

Effects and features of the fourth and fifth aspects are largely analogous to those described above in relation to the first aspect.

Further features of, and advantages will become apparent when studying the appended claims and the following description. The skilled person will realize that different features may be combined to create embodiments other than those described in the following, without departing from the scope of the present disclosure.

BRIEF DESCRIPTION OF THE DRAWINGS

The above, as well as additional objects, features, and advantages, will be better understood through the following illustrative and non-limiting detailed description of exemplary embodiments, wherein.

DETAILED DESCRIPTION

Figure 1:
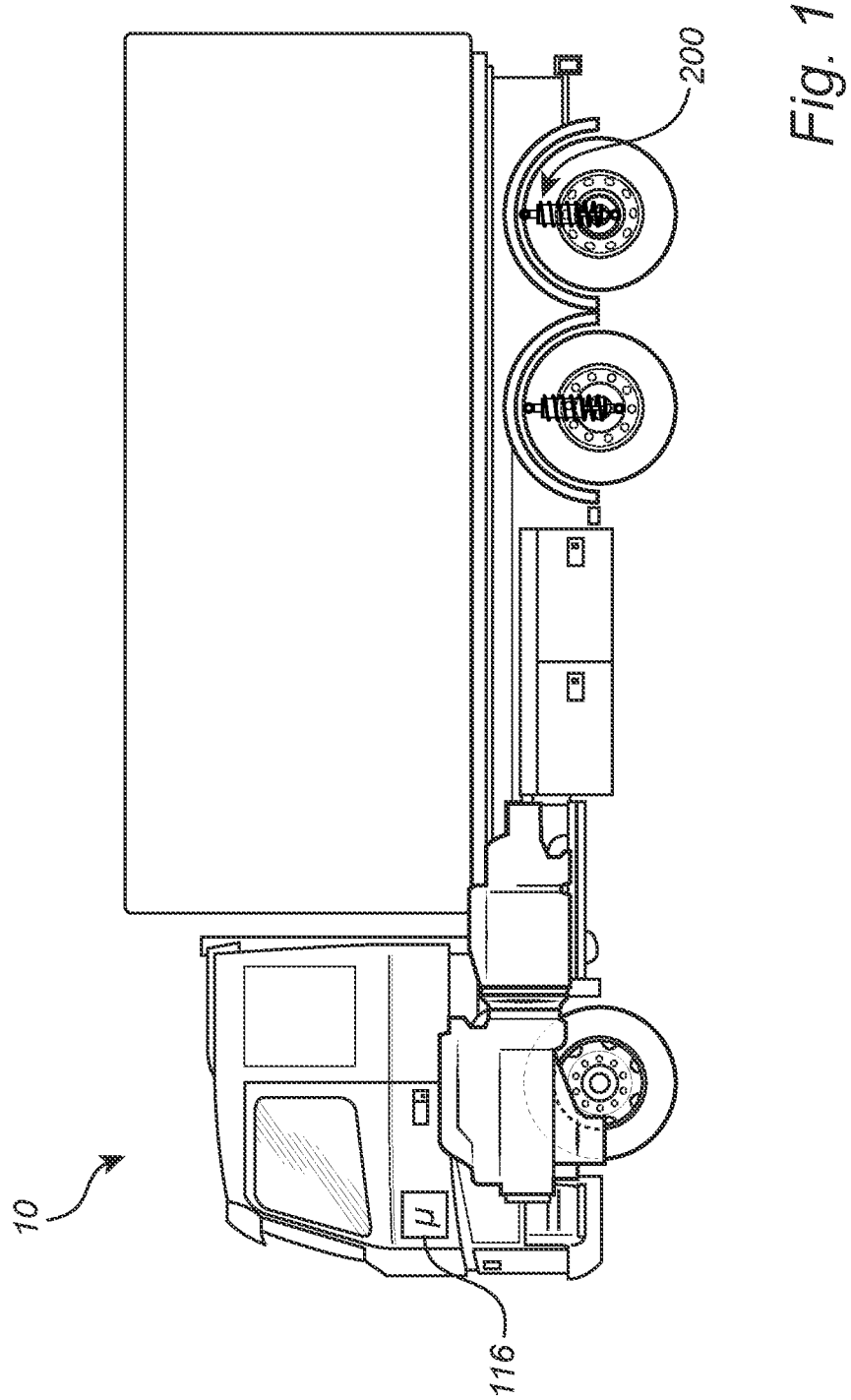
FIG. 1 is a lateral side view illustrating an example embodiment of a vehicle in the form of a truck.

The present invention will now be described more fully hereinafter with reference to the accompanying drawings, in which exemplary embodiments are shown. The invention may, however, be embodied in many different forms and should not be construed as limited to the embodiments set forth herein; rather, these embodiments are provided for thoroughness and completeness. Like reference character refer to like elements throughout the description.

With particular reference to FIG. 1, there is depicted a vehicle 10 in the form of a truck. The vehicle comprises a traction motor (not shown) for propelling the wheels of the vehicle. The traction motor is in the example embodiment an electric traction motor in the form of an electric machine. The vehicle 10 also comprises a control unit 116 for controlling various operations as will also be described in further detail below, and a vehicle air management system (not shown in detail in FIG. 1) operable to control the supply of pressurized air to various air consumers of the vehicle. FIG. 1 is illustrating an exemplified air consumer 200 in the form of an air suspension system.

The control unit 116 may include a microprocessor, microcontroller, programmable digital signal processor or another programmable device. The control unit may also, or instead, include an application specific integrated circuit, a programmable gate array or programmable array logic, a programmable logic device, or a digital signal processor. Where the control unit 116 includes a programmable device such as the microprocessor, microcontroller or programmable digital signal processor mentioned above, the processor may further include computer executable code that controls operation of the programmable device.

Figure 2:
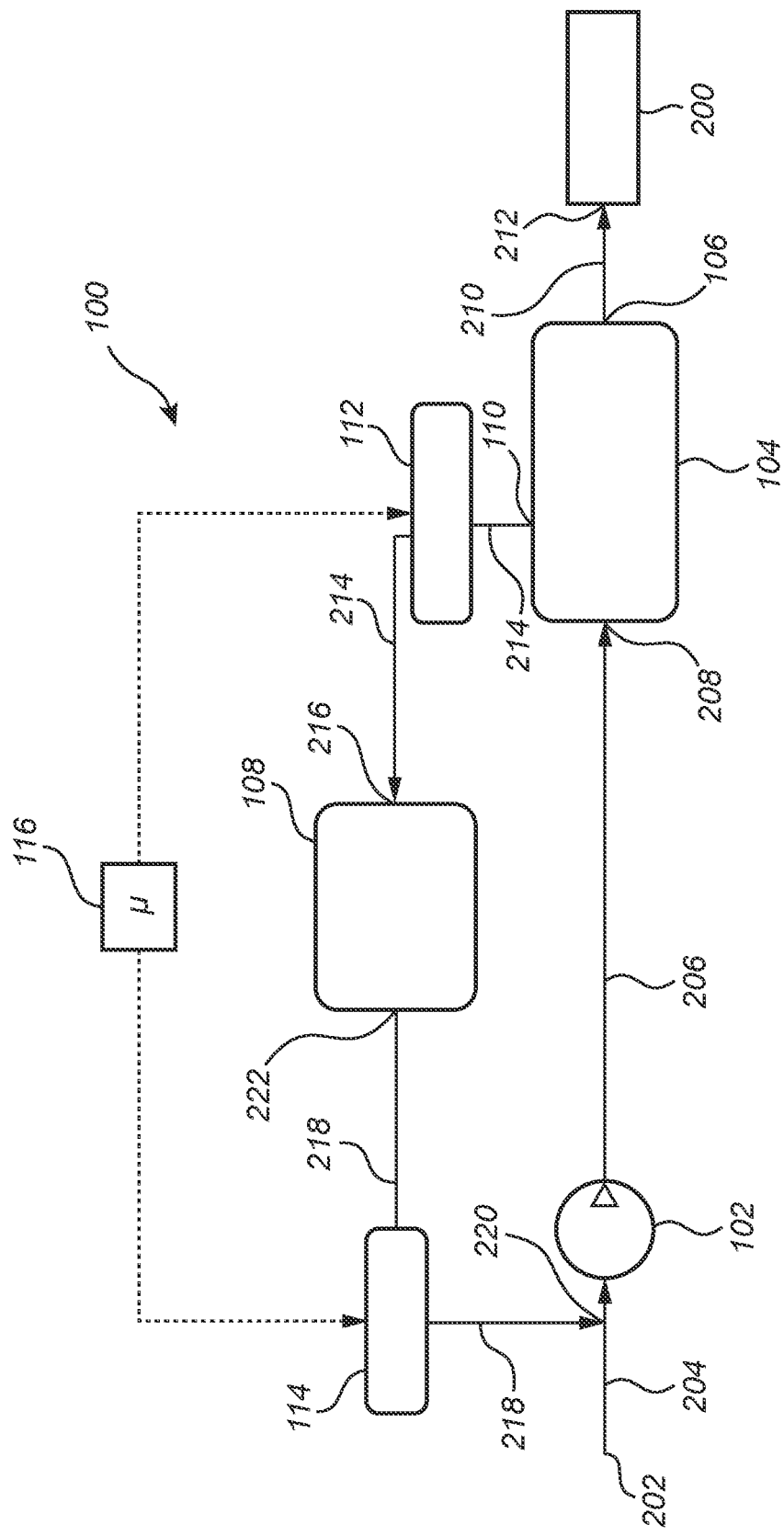
FIG. 2 is a schematic illustration of a vehicle air management system according to an example embodiment.

In order to describe the vehicle air management system 100 in further detail, reference is now made to FIG. 2. The air management system 100 comprises an air inlet 202 which is arranged to receive ambient air. The ambient air is directed from the air inlet 202 to an air compressor 102 via an air inlet conduit 204. The air management system 100 further comprises an air tank 104 arranged in downstream fluid communication with the air compressor 102. Thus, the air tank 104 is configured to receive pressurized air from the air compressor 102 via an air tank inlet conduit 206. The pressurized air is entering the air tank 104 at a tank inlet 208. The air tank 104 is configured to controllably supply the pressurized air to the air consumer 200 of the vehicle 10 when the air consumer requests a flow of pressurized air. In further detail, the air consumer 200 is arranged in fluid communication with the air tank 104 by means of a first outlet conduit 210. The first outlet conduit 210 is arranged between a first outlet 106 or the air tank 104 and an inlet 212 of the air consumer 200. Although FIG. 2 illustrates a single air consumer 200, it should be readily understood that the present invention is particularly applicable for the use of a plurality of air consumers but only one air consumer is illustrated for simplified understanding. Also, and although not depicted, it should be understood that the air consumer may also comprise an outlet. Such outlet can direct the air, after usage, to the ambient environment, or back to the air inlet 202. The outlet can direct the consumed air to other positions as well, such as to another air consumer of the vehicle, etc.

Furthermore, the vehicle air management system 100 also comprises a boost air tank 108. The boost air tank 108 is arranged in downstream fluid communication with the air tank 104. In particular, the boost air tank 108 is connected to the air tank 104 via a second outlet conduit 214. The second outlet conduit 214 is connected between a second outlet 110 of the air tank 104 and a boost tank inlet 216. As is illustrated in FIG. 2, the boost air tank 108 is also arranged in upstream fluid communication with the air compressor 102. In particular, a boost outlet conduit 218 is connected between a boost outlet 222 and the air compressor 102. In the exemplified embodiment of FIG. 2, the boost outlet conduit 218 is connected to an intersection position 220, which intersection position 220 connects to the boost outlet conduit 218 to the air inlet conduit 204. Thus, pressurized air from the boost air tank 108 can, as will be described in further detail below, be supplied to the air compressor 102.

As is also depicted in FIG. 2, the vehicle air management system 100 comprises a first valve 112 and a second valve 114. The first valve 112 is arranged in downstream fluid communication with the second outlet 110 of the air tank 104. In further detail, the first valve 112 is arranged in the second outlet conduit 214, i.e. in fluid communication between the air tank 104 and the boost air tank 108. The second valve 114 is arranged in downstream fluid communication with the boost air tank 108. In further detail, the second valve 114 is arranged in the boost outlet conduit 218, i.e. in fluid communication between the boost air tank 108 and the air compressor 102.

The first valve 112 is preferably arranged as a normally open valve. Hence, the first valve 112 is arranged in an open position when not actively controlled, thereby allowing a flow of air from the air tank 104 to be supplied to the boost air tank 108. The first valve 112 is arranged to prevent air from the air tank 104 to reach the boost air tank 108 when being actively controlled by the control unit 116 to assume a closed position. The second valve 114 on the other hand is preferably arranged as a normally closed valve. Hence the second valve 114 is arranged in a closed position when not actively controlled, thereby preventing a flow of pressurized air from the boost air tank to reach the air compressor 102. The second valve 114 is arranged to allow a flow of pressurized air from the boost air tank 108 to reach the air compressor 102 when being actively controlled by the control unit 116 to assume an open position.

The above described control unit 116 is, as can be seen in FIG. 2, is thus connected to the first 112 and second valves 114 to control operation thereof. The control unit 116 may be connected to the first 112 and second 114 valves by wire or by wireless communication.

During operation of the vehicle air management system 100, the control unit 116 is configured to receive a signal indicative of an air consumption level of the air consumer 200. The signal may be received from e.g. an air tank pressure sensor which is described in further detail below. The control unit 116 may also receive a signal indicating the current usage of the air consumer 200. Such signal may, for example, be received by an upper layer vehicle control system which determines the current operation of the air consumer. Hence, the air consumption level is a measure of how much air being needed by the air consumer for proper operation.

The control unit 116 compares the air consumption level with a predetermined threshold limit. The predetermined threshold limit preferably corresponds to the amount of pressurized air being suppliable from the air tank 104 through the first outlet 106. More preferably, the predetermined threshold limit is a value indicating the rate of pressurized air that can be supplied through the first outlet 106, i.e. how much air, per unit of time, the air tank 104 is able to deliver to the air consumer 200.

When the air consumption level of the air consumer 200 is higher than the predetermined threshold limit, i.e. when the air tank 104 is unable to deliver a sufficient flow of pressurized air to the air consumer 200, the control unit 116 controls the first valve 112 to assume the closed position as well as controls the second valve 114 to assume the open position. In other words, the control unit 116 controls the first valve 112 to assume the closed position as well as controls the second valve 114 to assume the open position when the air tank 104 is unable to meet the air pressure demand from the air consumer 200. Preferably, the first 112 and second 114 valves are controlled to assume the respective closed and open positions at substantially the same point in time.

Hereby, the boost air tank 108 is supercharging the air compressor 102 with pressurized air, thereby enabling the air compressor 102 to deliver a flow of increased pressurized air to the air tank 104. Thus, the flow of increased pressurized air is thus provided with a higher pressure and air mass flow level compared to the pressure and air mass flow level obtainable by the air compressor 102 when the second valve 114 is closed. Since the first valve 112 is closed, air pressure can be steadily increased in the air tank 104 to meet the air pressure demand from the air consumer.

On the other hand, when the air consumption level is lower than the predetermined threshold limit, i.e. the air tank is able to meet the pressure demand from the air consumer, the control unit controls the first valve 112 to assume the open position, and controls the second valve 114 to assume the closed position. Hereby, air is allowed to be supplied from the air tank 104 to the boost air tank 108, while pressurized air from the boost air tank 108 is prevented from reaching the air compressor 102. The air pressure level can thus be increased in the boost air tank 108 for a subsequent supercharging of the air compressor 102. When the first valve 112 is a normally open valve the control unit 116 controls the first valve 112 to assume the open position by omitting the transmittal of a control signal to the first valve 112. In a similar vein, when the second valve 114 is a normally closed valve, the control unit 116 controls the second valve 114 to assume the closed position by omitting the transmittal of a control signal to the second valve 114.

Figure 3:
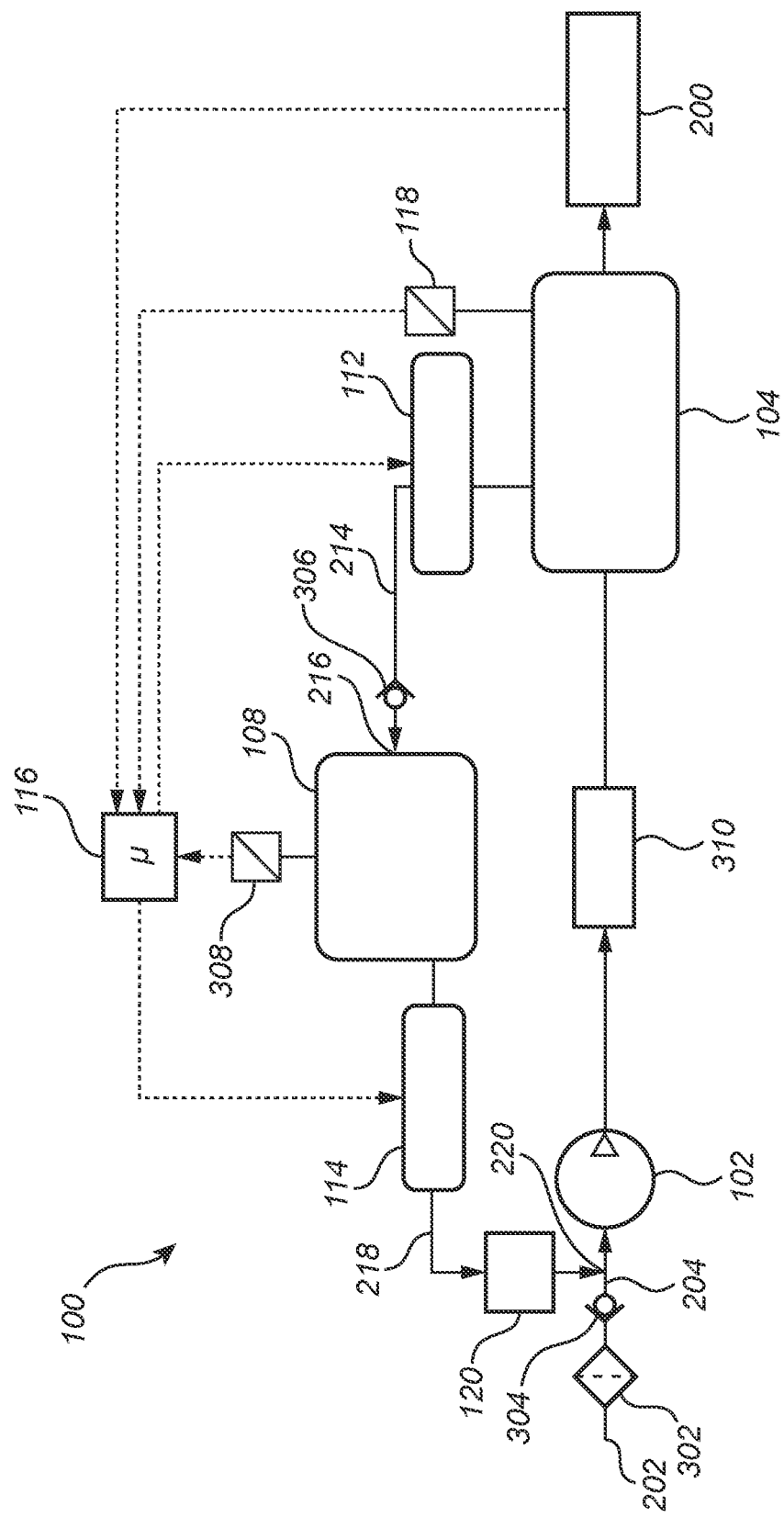
FIG. 3 is a schematic illustration of a vehicle air management system according to another example embodiment.

In order to describe the vehicle air management system 100 according to another, more detailed, example embodiment, reference is made to FIG. 3. FIG. 3 is a schematic illustration of a vehicle air management system according to another example embodiment. The components, and their functionality, of the vehicle air management system 100 described above in relation to FIG. 2 are also present in the FIG. 3 example embodiment. These components will therefore not be described in detail in the following disclosure.

As can be seen in FIG. 3, and as briefly indicated above, the air tank 104 is provided with an air tank pressure sensor 118 connected to the control unit 116. The air tank pressure sensor 118 can hereby detect sudden variations in the pressure level of the air tank. In detail, the control unit 116 can determine, based on the signal from the air tank pressure sensor 118, a reduction rate of the air pressure within the air tank 104 to thereby determine an air consumption level of the air consumer 200. The vehicle air management system 100 may hereby be determined to be unable to meet the air pressure demand from the air consumer if the reduction rate of air pressure within the air tank 104 exceeds a production rate of pressurized air from the air compressor 102. In other words, if the rate of pressurized air leaving the air tank 104 is higher than the rate of pressurized air the air compressor 102 is able to supply to the air tank, the air compressor 102 should be supercharged with pressurized air from the boost air tank 108 according to the above description.

As is also depicted, the air consumer 200 itself may be connected to the control unit 116, whereby the control unit 116 can receive a signal indicating the current air usage of the air consumer 200 for determining the above described air consumption level.

Furthermore, the vehicle air management system 100 depicted in FIG. 3 also comprises an air filter 302 and a first one-way valve 304 in the inlet conduit 204. In detail, the air filter 302 and the first one-way valve 304 are arranged in fluid communication between the air inlet 202 and the air compressor 102. The vehicle air management system 100 also comprises a second one-way valve 306 positioned in the second outlet conduit 214, i.e. in fluid communication between the first valve 112 and the boost tank inlet 216.

As can also be seen in FIG. 3, the vehicle air management system 100 further comprises a pressure regulator 120 in the boost outlet conduit 218. As exemplified in FIG. 3, the pressure regulator 120, which is preferably a variable pressure regulator, is arranged in fluid communication between the second valve 114 and the intersection position 220, i.e. arranged upstream the air compressor 102. Hereby, the pressure level of pressurized air from the boost air tank 108 to the air compressor 102 can be controlled. Although not depicted in FIG. 3, the pressure regulator 120 may be controlled by the control unit 116. Hence, based on e.g. a requested pressure level of the air consumer, the control unit 116 can control the variable pressure regulator to deliver a flow of pressurized air, with a suitable pressure level for meeting the pressure demand, to the air compressor 102.

Moreover, the boost air tank in FIG. 3 further comprises boost air tank pressure sensor 308 connected to the control unit 116. The control unit 116 can hereby receive a signal indicative of the pressure level of the boost air tank 108 and control the first 112 and second 114 valves based on the signal. For example, when the pressure level in the boost air tank is below a predetermined boost air pressure threshold limit, the first valve can be kept open, and the second valve kept closed to increase the pressure level in the boost air tank 108. However, should the pressure level in the boost air tank 108 exceed the predetermined boost air pressure threshold limit, the control unit 116 may control the first valve 112 to assume the closed position and control the second valve 114 to assume the open position to thereby reduce the pressure level in the boost air tank 108.

As is also depicted in FIG. 3, the vehicle air management system 100 further comprises an air dryer in fluid communication between the air compressor 102 and the air tank 104 for removing liquid fluid from the pressurized air entering the air tank 104.

Figure 4:
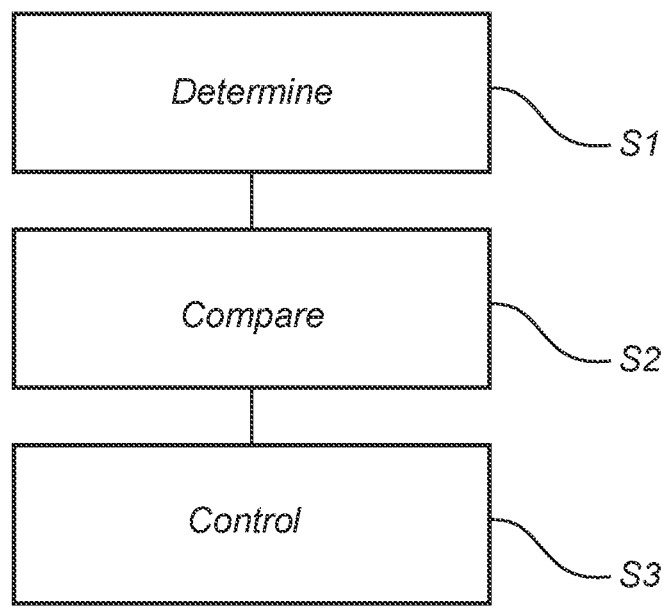
FIG. 4 is a flow chart of a method of controlling the vehicle air management system in any one of FIGS. 2 and 3.

In order to summarize, reference is now made to FIG. 4 which is a flow chart of a method of controlling the vehicle air management system 100 described above in relation to FIGS. 2 and 3. During operation of the vehicle 10, the control unit 116 determines S1 an air consumption level of the air consumer 200. This can be accomplished according to the above description, i.e. by receiving a signal from the air tank pressure sensor 118, receiving a signal directly from the air consumer 200 relating to the current consumption, etc.

The control unit thereafter compares S2 the air consumption level with a predetermined threshold limit. When the air consumption level of the air consumer 200 is higher than a predetermined threshold limit, the control unit 116 controls S3 the first valve 112 to assume the closed position to prevent air from the air tank 104 to reach the boost air tank 108, and controls the second valve 114 to assume the open position to allow pressurized air from the boost air tank 108 to reach air compressor 102.

It is to be understood that the present disclosure is not limited to the embodiments described above and illustrated in the drawings; rather, the skilled person will recognize that many changes and modifications may be made within the scope of the appended claims.

The invention claimed is:

1. A vehicle air management system for a vehicle, the vehicle air management system comprising:
   an air compressor configured to receive air from an air inlet via an air inlet conduit of the vehicle air management system,
   an air tank arranged in downstream fluid communication with the air compressor and configured to receive pressurized air from the air compressor, wherein the air tank comprises a first outlet connectable to at least one air consumer of the vehicle,
   a boost air tank configured to contain pressurized air, the boost air tank being arranged in downstream fluid communication with a second outlet of the air tank, wherein the boost air tank is arranged in upstream fluid communication with the air compressor,
   a first valve arranged in fluid communication between the air tank and the boost air tank,
   a second valve arranged in fluid communication between the boost air tank and the air compressor, and
   a control unit connected to the first and second valves, wherein the control unit comprises control circuitry configured to:
      receive a signal indicative of an air consumption level of the at least one air consumer,
      compare the air consumption level with a predetermined threshold limit, and when the air consumption level is higher than the predetermined threshold limit:
         control the first valve to assume a closed position to prevent air from the air tank to reach the boost air tank, and control the second valve to assume an open position to allow pressurized air from the boost air tank to reach air compressor for increasing a production rate of the pressurized air delivered from the air compressor.

2. The vehicle air management system according to claim 1, wherein the air tank further comprises an air tank pressure sensor connected to the control unit, wherein the signal indicative of the air consumption level is configured to be received from the air tank pressure sensor.

3. The vehicle air management system according to claim 2, wherein the air consumption level is based on a reduction rate of the air pressure in the air tank.

4. The vehicle air management system according to claim 3, wherein the predetermined threshold limit is based on a production rate of pressurized air supplied from the air compressor to the air tank.

5. The vehicle air management system according to claim 1, wherein the vehicle air management system further comprises a pressure regulator in fluid communication between the second valve and the air compressor.

6. The vehicle air management system according to claim 5, wherein the pressure regulator is a variable pressure regulator.

7. The vehicle air management system according to claim 1, wherein the first valve is a normally open valve.

8. The vehicle air management system according to claim 1, wherein the second valve is a normally closed valve.

9. The vehicle air management system according to claim 1, wherein the control circuitry is further configured to, when the air consumption level is lower than the predetermined threshold limit, control the first valve to assume an open position to allow air to be supplied from the air tank to the boost air tank, and control the second valve to assume a closed position to prevent pressurized air from the boost tank to reach the air compressor.

10. The vehicle air management system according to claim 9, wherein the control circuitry is configured to control the first valve to assume the open position and the second valve to assume the closed position by omitting from transmitting a control signal to the first and second valves, respectively.

11. The vehicle air management system according to claim 1, wherein the boost air tank comprises a boost air tank pressure sensor connected to the control unit, wherein the control circuitry is configured to control the first and second valves based on a signal received from the boost air tank pressure sensor, the signal being indicative of a pressure level of the air in the boost air tank.

12. A vehicle, comprising a vehicle air management system according to claim 1, and an air consumer arranged in downstream fluid communication with the first outlet of the air tank.

13. A method of controlling a vehicle air management system, the air management system comprising an air compressor, an air tank arranged in downstream fluid communication with the air compressor and configured to receive pressurized air from the air compressor, wherein the air tank comprises a first outlet connected to an air consumer of the vehicle, a boost air tank configured to contain pressurized air, the boost air tank being arranged in downstream fluid communication with a second outlet of the air tank, wherein the boost air tank is arranged in upstream fluid communication with the air compressor, a first valve arranged in fluid communication between the air tank and the boost air tank, and a second valve arranged in fluid communication between the boost air tank and the air compressor, wherein the method comprises:

determining an air consumption level of the air consumer, comparing the air consumption level with a predetermined threshold limit, and when the air consumption level is higher than the predetermined threshold limit:

controlling the first valve to assume a closed position to prevent air from the air tank to reach the boost air tank, and controlling the second valve to assume an open position to allow pressurized air from the boost air tank to reach air compressor.

14. A computer program comprising program code for performing the steps of claim 13 when the program code is run on a computer.

15. A computer readable medium carrying a computer program for performing the steps of claim 13 when the program is run on a computer.

\* \* \* \* \*